(12) United States Patent
Bhatia et al.

(10) Patent No.: US 11,997,056 B2
(45) Date of Patent: May 28, 2024

(54) LANGUAGE MODEL WITH EXTERNAL KNOWLEDGE BASE

(71) Applicant: ADOBE INC., San Jose, CA (US)

(72) Inventors: Sumit Bhatia, New Delhi (IN); Jivat Neet Kaur, Delhi (IN); Rachit Bansal, New Delhi (IN); Milan Aggarwal, Delhi (IN); Balaji Krishnamurthy, Noida (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/897,419

(22) Filed: Aug. 29, 2022

(65) Prior Publication Data

US 2024/0073159 A1    Feb. 29, 2024

(51) Int. Cl.
*H04L 51/02* (2022.01)
*G06F 40/295* (2020.01)
*G06N 5/022* (2023.01)

(52) U.S. Cl.
CPC ............ *H04L 51/02* (2013.01); *G06F 40/295* (2020.01); *G06N 5/022* (2013.01)

(58) Field of Classification Search
CPC ........ H04L 51/02; G06F 40/295; G06N 5/022
See application file for complete search history.

(56) References Cited

U.S. PATENT DOCUMENTS

| | | | |
|---|---|---|---|
| 2022/0292262 A1* | 9/2022 | Japa | G06F 16/90332 |
| 2023/0009946 A1* | 1/2023 | Rossiello | G06F 40/35 |
| 2023/0316001 A1* | 10/2023 | Araki | G06F 40/30 |
| | | | 704/9 |

* cited by examiner

*Primary Examiner* — Suraj M Joshi
(74) *Attorney, Agent, or Firm* — Shook, Hardy & Bacon L.L.P.

(57) ABSTRACT

The technology described herein receives a natural-language sequence of words comprising multiple entities. The technology then identifies a plurality of entities in the natural-language sequence. The technology generates a masked natural-language sequence by masking a first entity in the natural-language sequence. The technology retrieves, from a knowledge base, information related to a second entity in the plurality of entities. The technology then trains a natural-language model to respond to a query. The training uses a first representation of the masked natural-language sequence, a second representation of the information, and the first entity.

20 Claims, 6 Drawing Sheets

LANGUAGE MODEL WITH EXTERNAL KNOWLEDGE BASE

BACKGROUND

Pre-trained language models (PLMs) have achieved excellent performance on a variety of downstream natural language processing (NLP) tasks. Much of this success can be attributed to the significant semantic and syntactic information captured in the contextual representations learned by PLMs. In addition to applications requiring linguistic knowledge, PLMs have also been useful for a variety of tasks involving factual knowledge. PLMs may store significant world knowledge (e.g., facts) in their parameters.

PLMs are typically fed a large amount of unstructured text during training, which enables linguistic nuances and world knowledge to be captured in the model parameters. However, this implicit knowledge storage in the form of the parameter weights not only leads to inaccurate model predictions, but also poses constraints on the amount of knowledge that can be stored.

SUMMARY

The technology described herein retrieves information from a knowledge base and inputs the information into a natural language processing model to help the NLP model respond accurately to an input, such as a query. Retrieving relevant information from the knowledge base and allowing the NLP model to use the information when making a prediction reduces the need for the NLP model to store facts. Further knowledge bases can store much more information than a NLP model. Thus, retrieving information from the knowledge base increases the amount of information available to the NLP model compared to implicit storage of information in the model parameters.

Currently, factual knowledge is implicitly represented as parameter weights within a NLP model. The implicit representation makes it difficult to accurately retrieve knowledge from an NLP model. In contrast, a knowledge base is able to store a large amount of information about many people, places, and things. Knowledge bases also store explicit relationships between entities. This information may be stored in the form of a triple, which comprises a first entity, second entity, and a relationship between the entities.

In an aspect, the technology described herein identifies entities within a natural language input to a NPL model, such as a query. The identified entities are used to retrieve information from the knowledge base in the form of triples. The triples can relate to one or more identified entities. The triples can be assigned a similarity score that measures an amount of similarity to the natural language input. The similarity score is used to select the most relevant triples. For example, the five most relevant triples are those with the most similarity. A threshold amount (e.g., top five) of triples is provided as input to NLP model along with a natural language input. The NLP model processes both the natural language input and the triples to generate a response.

DETAILED DESCRIPTION

The technology described herein retrieves information from a knowledge base and inputs the information into a natural language processing model to help the NLP model respond accurately to an input, such as a query. Currently, factual knowledge is implicitly represented as parameter weights within a NLP model. The implicit representation makes it difficult to accurately retrieve knowledge from an NLP model. For example, an NLP model may be trained on text that communicates that Barack Obama is a former president of the United States. Nevertheless, when asked "what country Barack Obama was president of", the NLP model may provide the wrong answer. The NLP model may correctly understand that the question should return an entity commonly associated with the term president within the training text, but returning the correct entity associated with president is a challenge because "president" is not explicitly associated with Barack Obama.

In contrast, a knowledge base is able to store a large amount of information about many people, places, and things. Knowledge bases also store explicit relationships between entities. This information may be stored in the form of a triple, which comprises a first entity, second entity, and a relationship between the entities. For example, a triple could comprise Barack Obama, president, United States. This triple explicitly relates Barack Obama to the relationship of president and the corresponding entity United States.

In an aspect, the technology described herein identifies entities within a natural language input to a NPL model, such as a query. The identified entities are used to retrieve information from the knowledge base in the form of triples. The triples can relate to one or more identified entities. The triples can be assigned a similarity score that measures an amount of similarity to the natural language input. In an aspect, the similarity between a relationship in a triple and the natural language input is emphasized by calculating a relationship similarity score. The relationship similarity score can be combined with an overall triple similarity score to produce the final similarity score. The final similarity score is used to select the most relevant triples. For example, the five most relevant triples are those with the most similarity.

A threshold amount (e.g., top five) of triples is provided as input to NLP model along with a natural language input. The NLP model processes both the natural language input and the triples to generate a response.

Providing triples from the knowledge base improves training efficiency and conserves computing resources. Training efficiency is improved by reducing the amount of training that needs to occur for an NLP model to produce accurate responses. The training data set does not need to include an extensive amount of facts. Instead, the NLP model can learn to rely on facts provided from the knowledge base. Not only is less data required, but the NLP model can be smaller because it needs much less information to be implicitly stored. Additionally, the world is constantly changing and new facts can be added to the knowledge base and utilized by the NLP model without updating the NLP model. For example, an NLP model that understands the concept of country president can answer questions related to the new president as new presidents are elected even though the new president is not mentioned in training data provided to the NLP model.

Figure 1:
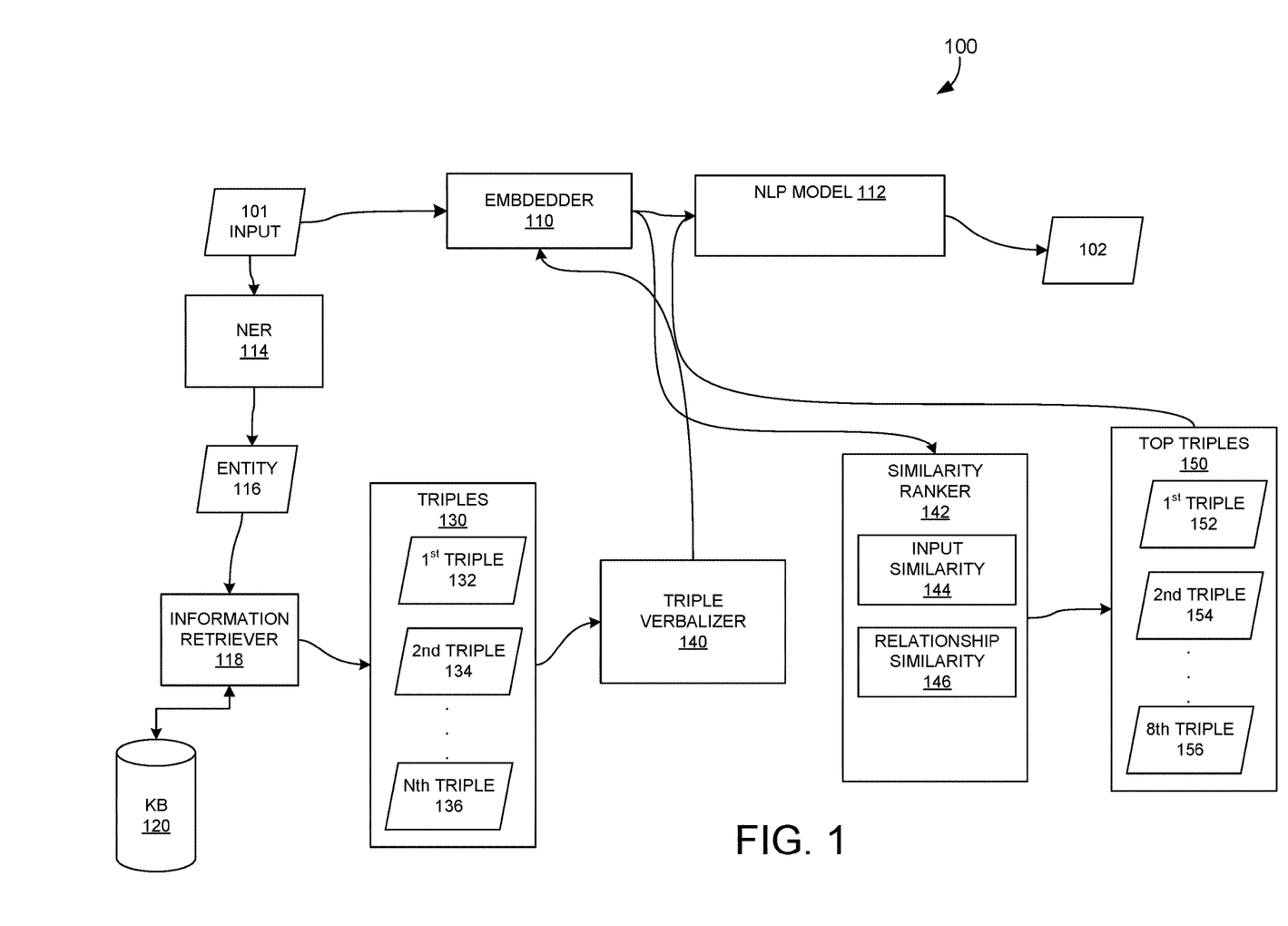
FIG. 1 is an illustration of a computing environment for dynamically providing information from a knowledge base to natural language model, in accordance with embodiments of the technology described herein.

Turning now to FIG. 1, a natural language processing model with knowledge base input, environment 100 is shown, in accordance with implementations of the present disclosure. The environment 100 includes an embedder 112, a NLP model 112, NER Model 114, a knowledge base 120, a triple verbalizer 140, and a similarity ranker 142. The environment 100 operates on one or more computing devices that may include client-side devices and server-side devices. In aspects, operations may be split between client-side devices and server-side devices. Further, the components shown may interact with computing devices not shown in FIG. 1, such as user devices. For example, various user interfaces generated by, or with information generated by the components shown, may be displayed on a user device, such as a laptop.

The arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example environment 100, it is contemplated that in some embodiments functionality of these components are shared or distributed across other components.

A high-level, the NLP model 112 receives a natural language input 101 and produces an output 102. The form of the natural language input 101 and the output 102 can differ depending on the task being performed by the NLP model 112. The technology described herein may be useful in knowledge-intensive natural language processing tasks, such as conversational systems (e.g., chatbots), question answering, and search applications. Search applications receive a natural language query for input and provide one or more results that are responsive to the query.

Conversational systems interact with a user through audio and/or textual inputs and outputs. The conversational system may receive a natural language question or statement and provide a response. For example, a user may state, "I like whales." This is not a question or query, but a conversational system may provide a response, such as, "did you know that blue whales are the largest whales." In the context of the technology described herein, the NLP model 112 may use the knowledge base 122 retrieve knowledge about whales that can be used to formulate the response.

Question answering is a type of information retrieval and natural language processing system that automatically answer questions posed by humans in a natural language. The input question can take many forms. For example, the input question types can include fact, list, definition, how, why, and hypothetical, among other types. The question answering system may be open domain or closed domain. Closed-domain question answering systems only answer questions under a specific domain (for example, entertainment or home maintenance), and can exploit domain-specific knowledge formalized in ontologies. Alternatively, closed-domain might refer to a situation where only a limited type of questions are accepted, such as questions asking for descriptive information, rather than procedural information. Open-domain question answering receives questions about nearly anything.

The environment 100 includes a NLP model 112 $\mathcal{L}$ (such as BERT, RoBERTa, T5, and GPT) and a knowledge base 120 $\mathcal{K}$ = $\{t_{hrt}$=<h, r, t>|h, t$\in \mathcal{E}$ ; r$\in \mathcal{R}$ $\}$. The knowledge base 120 $\mathcal{K}$ may comprise a set of triples such that each triple $t_{hrt}$ represents the relationship r between entities h and t. $\mathcal{E}$ is the set of all the entities, and $\mathcal{R}$ is the set of all the relationship types present in the knowledge base 120. Given a text input x, the environment 100 retrieves a set of triples $T_x \in K$ such that the triples in $T_x$ are contextually relevant to x. The NLP model 112 is then presented with the original input x and the contextually relevant knowledge in the form of $T_x$ and is trained to make predictions using this additional knowledge.

The NLP model 112 is trained to learn relevant semantic associations between natural language input text and various relation types present in the knowledge base 120. Identifying the correct relation types will allow the NLP model 112 to leverage the corresponding information from the knowledge base to make an accurate prediction. As described in more detail with reference to FIG. 2, the training may be accomplished using a modified Masked Language Modeling (MLM) pre-training objective.

In an aspect, the natural language input 101 is provided to both the embedder 110 and the named-entity recognition (NER) system 114. The NER system 114 performs a form of information extraction that seeks to locate and classify named entities mentioned in unstructured text into pre-defined entity classes, such as person names, organizations, locations, time expressions, quantities, monetary values, and the like. Named entities may be anything that exists independently. A named entity refers to a piece of real-world data. It can refer to a person, an organization, a location, or a product or service. Anything that can be attributed to a proper name may be considered a named entity. A named entity may be contrasted with an attribute of an entity. An entity may comprise one or more words or tokens. Thus, the starting input to a NER system 114 may be unstructured text, such as provided in input 101, and the output of the NER system 114 may be a labeled version of the unstructured text where entities are identified and possibly classified into an entity class.

A goal of the NER system 114 is to identify one or more entities within the natural language input 101 that are also described within the knowledge base 120. The NER system 114 may identify a plurality of entities 116. In addition, the information retriever 118 may retrieve information from the knowledge base 120 for each entity 116 identified by the NER system 114. The information retrieval process may include searching the knowledge base 120 for an identified entity. When an identified entity is found within the knowledge base 120, then information related to the identified entity may be retrieved from the knowledge base 120. In an aspect, the information is retrieved in the form of a knowledge base triple. A knowledge base triple, which may also be described as a fact, consists of three components: a subject, a predicate, and an object. In aspects, the identified entity may be either the subject or the object of a triple retrieved from the knowledge base 120. The predicate describes a relationship between the subject and the object. In a group of triples, the identified entity may be an object in some triples and a subject in other triples.

The knowledge base 120 stores information. The knowledge base 120 can take the form of a knowledge graph. A knowledge graph consists of nodes, edges, and labels. The combination of a two nodes and the labeled edge may be described as a triple. Anything can act as a node, for example, people, place, thing, date, country, company, and other entities. An edge connects a pair of nodes and captures the relationship of interest between the nodes, for example, birthday relationship between a person and a date, nationality relationship between a person and country, or an occupation relationship between a person and a job title. The labels capture the meaning of the relationship. Without the birthday label, a relationship between a person and a date could have many different meanings.

After the information retriever 118 retrieves the triples 130 related to the entities identified by the NER 114, the similarity ranker 142 ranks the triples based on their similarity to the input. In this example, the triples include a first triple 132, a second triple 134, and an Nth triple 136. The Nth triple 136 is used to illustrate that the amount of triples retrieved initially is not limited to a particular threshold number. Instead, the most relevant triples are identified, as described subsequently. In order to measure the contextual relevance of a given triple t to the input x, the similarity ranker 142 may compute two scores. The input similarity component 144 calculates an input similarity score, which measures a similarity between the input and an individual triple. The input similarity score can be calculated from a representation of the triple and a representation of the input. In an aspect, the representations are generated by the embedder 110. In one aspect, the inner product of the input representation and the triple representation is calculated to obtain the similarity score as follows.

$$\text{sim}(x,t)=\text{Emb}(x)^T\text{Emb}(t), t \in T_x \quad (1)$$

Here, Emb(•) may obtained using the embedder 110. While it is straightforward to obtain representations of input x, embedder 110, which is trained to process natural language text, may not be applied directly to knowledge base triples, which are not in a natural language format. In aspects, the representations used to determine similarity of the input and the triple are generated from the same embedding process. To convert the triple into a format that can be received by the embedder 110, the triple verbalizer 140 verbalizes the knowledge base triples by concatenating the head entity, the relationship, and the tail to form a natural language phrase. A representation of the verbalized triple is then generated by the embedder 110. For example, the triple (Warren_Buffett, hasOccupation, Investor) is verbalized as, "Warren Buffett has occupation Investor" and is fed as input to the embedder 110 to generate a representation.

A triple is highly relevant for the input text if the triple represents the same relationship described in the text. To capture this important signal, the relationship similarity component 146 calculated a relationship similarity score that measures a similarity between the relationship in the triple and the input text. In one aspect, relationship types in the knowledge base 120 are embedded in the same embedding space as triples using the embedder 110. The representations of the triple relationship r and the input text x can be computed as follows.

$$\text{sim}(x,r)=\text{Emb}(x)^T\text{Emb}(r), r \in \mathcal{R} \quad (2)$$

In equation 2, $\mathcal{R}$ is the set of all relations in the knowledge base. The final relationship similarity score for the triple t, sim(x, t) is obtained by taking a product of the input similarity score and the relationship similarity score. Based on this final similarity score, the similarity ranker 142 selects the top-k triples 150 that constitute the contextual knowledge to be fed as input along with x to the NLP model 112. For example, k may be 3, 5, 8, 10, or some other threshold. In this example, the top triples include a first triple 152, a second triple 154, and an 8th triple 156. The 8th triple 156 is used to illustrate that the amount of top triples may be limited to a threshold number k. In this example, k is 8.

Figure 2:
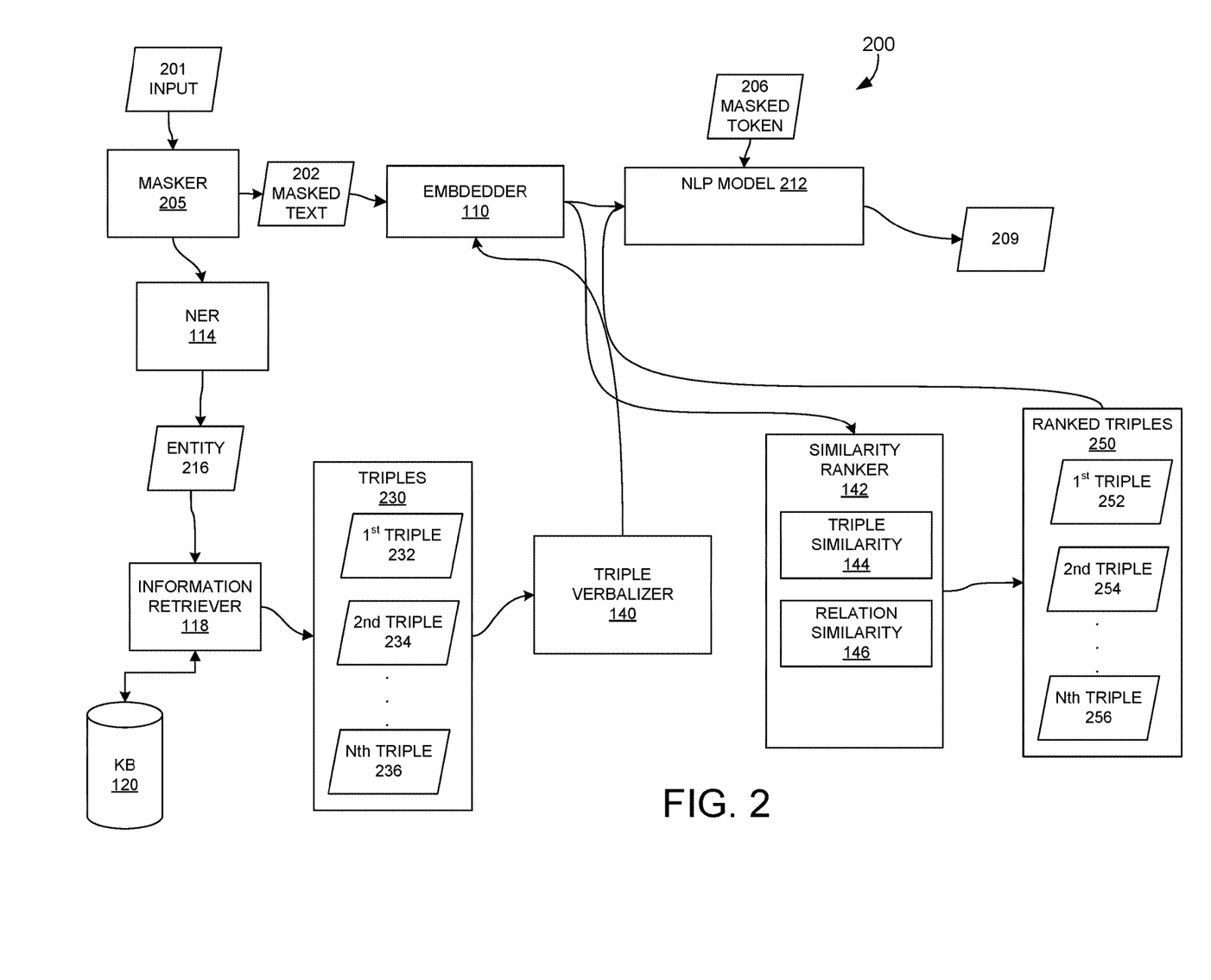
FIG. 2 is an illustration of a computing environment for training a natural language model to dynamically use information from a knowledge base when making an inference, in accordance with embodiments of the technology described herein.

Turning now to FIG. 2, an example process for the training a NLP model to use knowledge base information is shown. Training updates the model parameters to make an inference (or prediction) that is consistent with the training data. Thus, trained NLP model 112 and untrained NLP model 212 may have the same architecture, but still be different because each has unique parameters that are established during training with different data sets.

The training may occur using masked language modelling. The MLM training process starts with an input text 201. The masker 205 masks one or more words (or tokens) within the text 201 to create a masked text 202. The masked text 202 and masked token 206 are provided to the NLP model 212 as training input. During MLM training, the objective is for the NLP model 212 to predict the masked token 206 given the masked text 202. Once a prediction 209 is made, the NLP model 212 is then retrained, for example, to minimize loss between the prediction 209 and the masked token 206, which represents the ground truth.

Different strategies for explicitly masking entity information in the input text 201 to generate masked input 202 may be used. For example, entity representations may be obtained by knowledge base embeddings, using named entity recognizers (NER) and regular expressions, and by verbalizing knowledge base triples. In another aspect, entity masks are created by using Wikipedia as the base corpus for training. The human-annotated links in Wikipedia may be used for entity identification. One of the entities in the text may be randomly masked to generate training data. The official style guidelines of Wikipedia require the editors to link mentions of topics to their corresponding Wikipedia pages. By masking only the entity tokens (instead of randomly sampled words) and providing contextually relevant knowledge to the model retrieved from the knowledge base (as described in next subsection), the model may be trained to predict the masked entity tokens by utilizing the external knowledge.

Initially, a sentence is chosen and a valid entity in the sentence is chosen at random out of all the potential entities in the sentence. The masker 205 may mask the selected entity to create the input text x. In one aspect, the masker 205 filers out sentences starting with pronouns such as he, she, her, and they as many such sentences do not contain other useful signals to unambiguously predict the masked words. For instance, if the input example is—"He developed an interest in investing in his youth, eventually entering the Wharton School of the University of Pennsylvania" and Wharton School of the University of Pennsylvania is masked, the remaining words in the sentence are not providing informative signals to the model to predict the masked tokens.

Given the input sentence selected, the information retriever 118 fetches the relevant triples from the knowledge base 120. The representations of the input sentence and the retrieved triples are then concatenated and fed to the untrained NLP model 212 and the model is trained to minimize the following MLM loss.

$$L_{MLM} = \frac{1}{M} \sum_{m=1}^{M} \log p(x_{ind_m} | x, t_1, t_2 \ldots, t_k) \quad (3)$$

where M is the total number of [MASK] tokens in x and $ind_m$ is the index of the $m^{th}$ masked token.

With the additional contextual information available to the model, the model may learn the associations between linguistic cues in the input text and relevant relationship information in the triples. For example, the model may associate different ways in which someone's date of birth could be mentioned in natural language (such as X was born on, the birthday of X is, and numerous other linguistic variations) to the knowledge base relation "birthdate" and utilize the information from the corresponding triple.

Exemplary Methods

Figure 3:
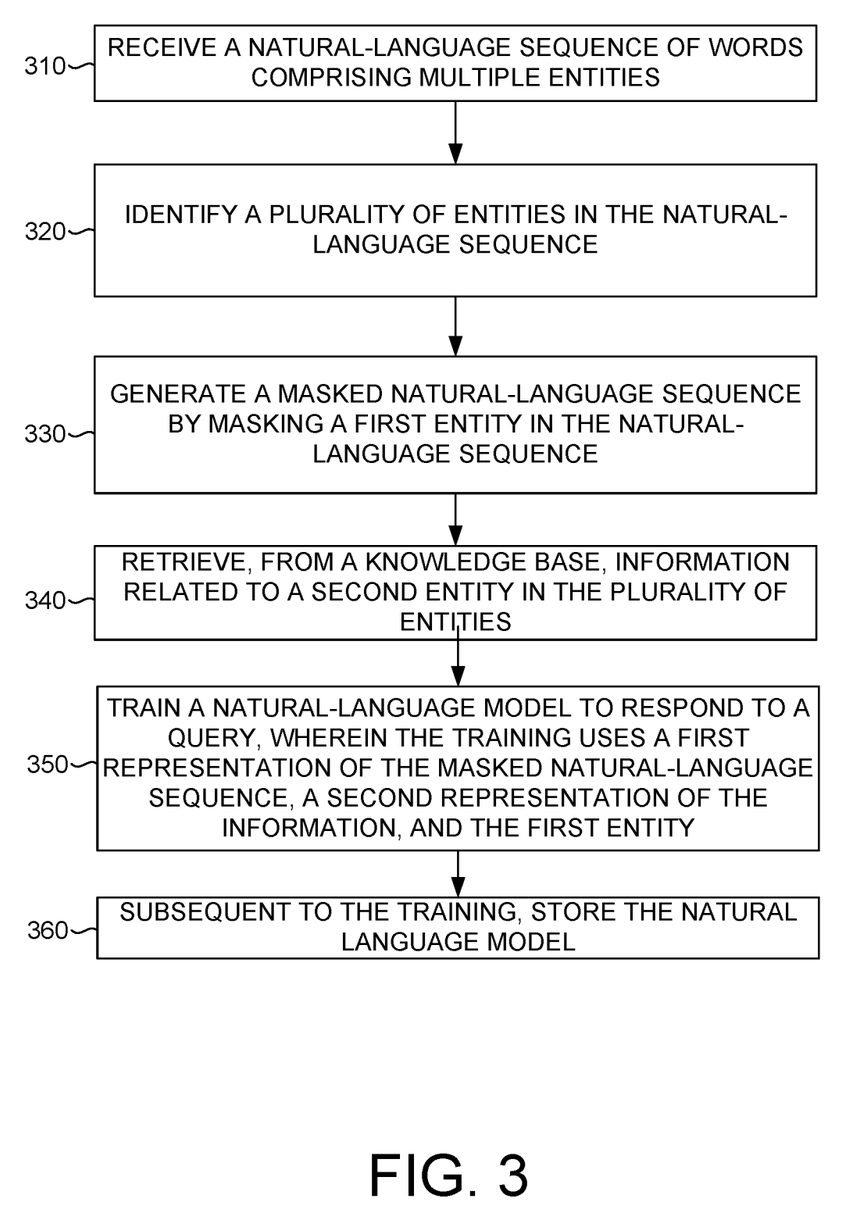
FIG. 3 provides an example method of training a machine classifier to learn a new class, in accordance with embodiments of the technology described herein.
Figure 4:
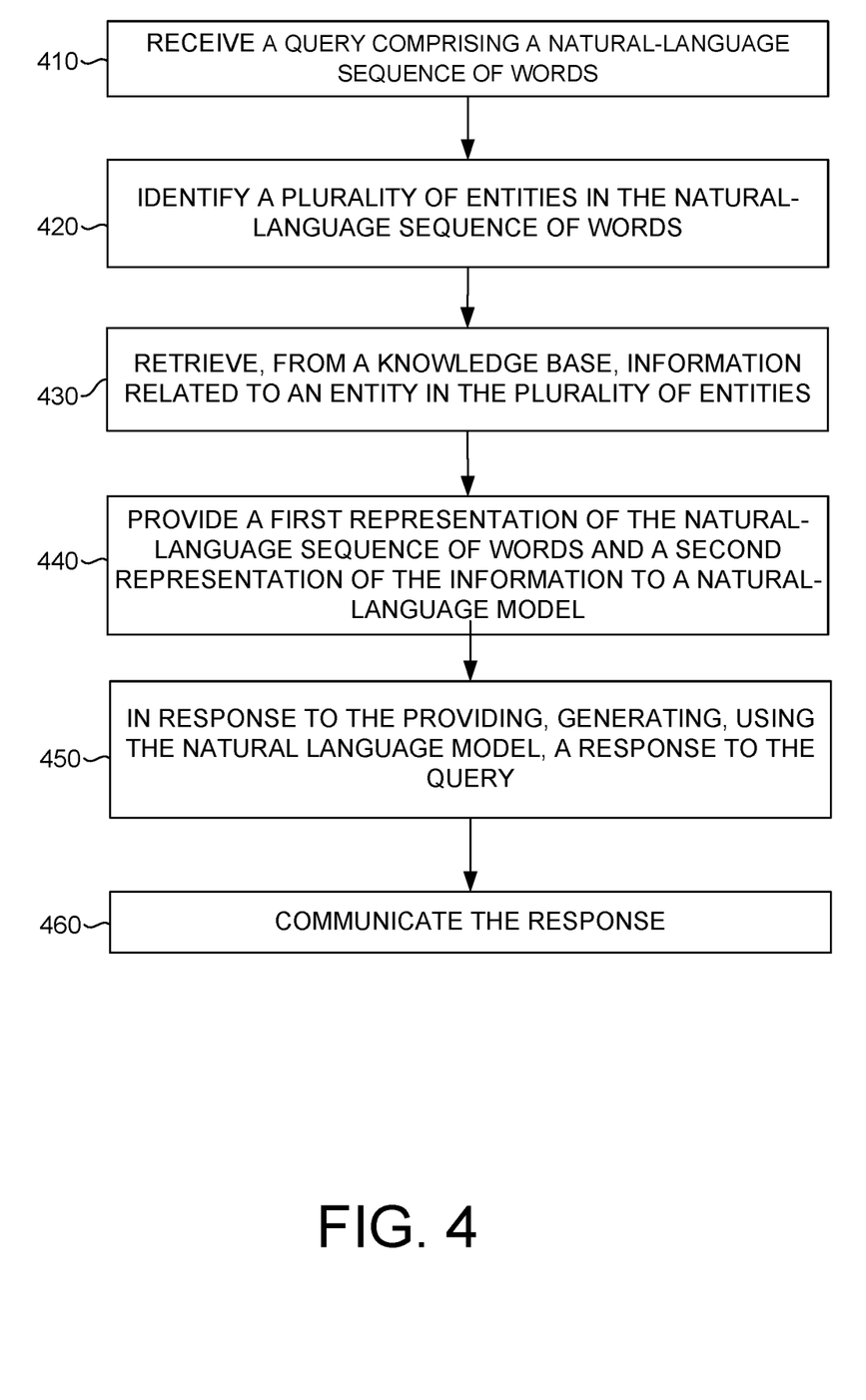
FIG. 4 provides an example method of classifying a textual object using a machine classifier to trained with synthetic training data, in accordance with embodiments of the technology described herein.
Figure 5:
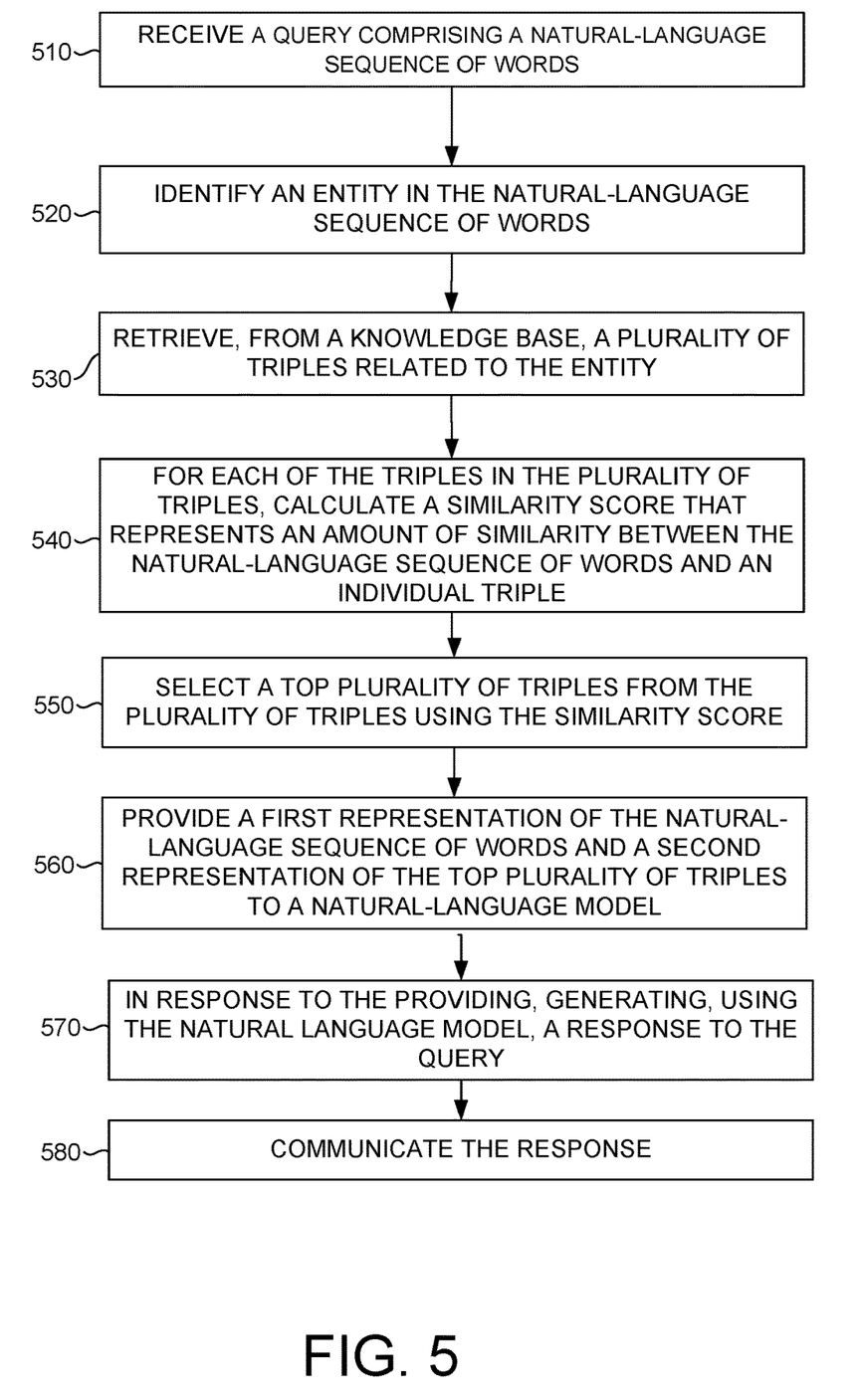
FIG. 5 provides an example method of training a machine classifier to learn a new class, in accordance with embodiments of the technology described herein.

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, methods 300, 400, and 500 are described, by way of example, with respect to the features of FIGS. 1-2. However, these methods may additionally or alternatively be executed by any one system, or any combination of systems, including, but not limited to, those described herein.

FIG. 3 is a flow diagram showing a method 300 for training a natural-language-processing (NLP) model to use information from a knowledge base to make a prediction, in accordance with some embodiments of the present disclosure. The method 300, at block 310 includes receiving a natural-language sequence of words comprising multiple entities. The natural natural-language sequence may be a sentence, paragraph, and/or clause. In one aspect, the natural-language sequence do not includes sequences with above a threshold amount of pronouns. Natural-language sequences with above the threshold of pronouns may be more effective training data.

The method 300, at block 320 includes identifying a plurality of entities in the natural-language sequence. A named-entity recognition (NER) system may be used to identify the plurality of entities. The plurality of entities may be persons, places, things, or other categories of real-world data.

The method 300, at block 330 includes generating a masked natural-language sequence by masking a first entity in the natural-language sequence. One of the entities in the text may be randomly masked to generate training data.

The method 300, at block 340 includes retrieving, from a knowledge base, information related to a second entity in the plurality of entities. In an aspect, the information is retrieved in the form of a knowledge base triple. A knowledge base triple, which may also be described as a fact, consists of three components: a subject, a predicate, and an object. In aspects, the identified entity may be either the subject or the object of a triple retrieved from the knowledge base. The predicate describes a relationship between the subject and the object. In a group of triples, the identified entity may be an object in some triples and a subject in other triples.

The method 300, at block 350 includes training a natural-language model to respond to a query, wherein the training uses a first representation of the masked natural-language sequence, a second representation of the information, and the first entity. The training can be performed by minimizing the Masked Language Modeling (MLM) loss, as described previously. The representations may be generated through an embedding process, as described previously.

The method 300, at block 360 includes subsequent to the training, storing the natural language model. The model may be trained for subsequent use generating responses to queries using data from the knowledge base.

FIG. 4 is a flow diagram showing a method 400 for using information from a knowledge base in a natural language model, in accordance with some embodiments of the present disclosure. The method 400, at block 410 includes receiving a query comprising a natural-language sequence of words. The query may be provided audibly or textually. The query may be provided through a search page, through a digital assistant or through another type of interface.

The method 400, at block 420 includes identifying a plurality of entities in the natural-language sequence of words. A named-entity recognition (NER) system may be used to identify the plurality of entities. The plurality of entities may be persons, places, things, or other categories of real-world data.

The method 400, at block 430 includes retrieving, from a knowledge base, information related to an entity in the plurality of entities. In an aspect, the information is retrieved in the form of a knowledge base triple. A knowledge base triple, which may also be described as a fact, consists of three components: a subject, a predicate, and an object. In aspects, the identified entity may be either the subject or the object of a triple retrieved from the knowledge base. The predicate describes a relationship between the subject and the object. In a group of triples, the identified entity may be an object in some triples and a subject in other triples.

The method 400, at block 440 includes providing a first representation of the natural-language sequence of words and a second representation of the information to a natural-language model. The representations may be generated through an embedding process, as described previously.

The method 400, at block 450 includes in response to the providing, generating, using the natural language model, a response to the query. The response is generated by processing the first representation of the natural-language sequence of words and a second representation of the information.

The method 400, at block 460 includes communicating the response.

FIG. 5 is a flow diagram showing a method 500 for using information from a knowledge base in a natural language model, in accordance with some embodiments of the present disclosure. The method 500, at block 510 includes receiving a natural-language sequence of words.

The method 500, at block 520 includes identifying an entity in the natural-language sequence of words.

The method 500, at block 530 includes retrieving, from a knowledge base, a plurality of triples related to the entity. A knowledge base triple, which may also be described as a fact, consists of three components: a subject, a predicate, and an object. In aspects, the identified entity may be either the subject or the object of a triple retrieved from the knowledge base. The predicate describes a relationship between the subject and the object. In a group of triples, the identified entity may be an object in some triples and a subject in other triples.

The method 500, at block 540 includes, for each of the triples in the plurality of triples, calculating a similarity score that represents an amount of similarity between the natural-language sequence of words and an individual triple.

The method 500, at block 550 includes selecting a top plurality of triples from the plurality of triples using the similarity score.

The method 500, at block 560 includes providing a first representation of the natural-language sequence of words and a second representation of the top plurality of triples to a natural-language model. The representations may be generated through an embedding process, as described previously.

The method 500, at block 570 includes in response to the providing, generating, using the natural language model, a response to the query. The response is generated by processing the first representation of the natural-language sequence of words and a second representation of the information.

The method 500, at block 580 includes communicating the response to the user.

EXEMPLARY OPERATING ENVIRONMENT

Figure 6:
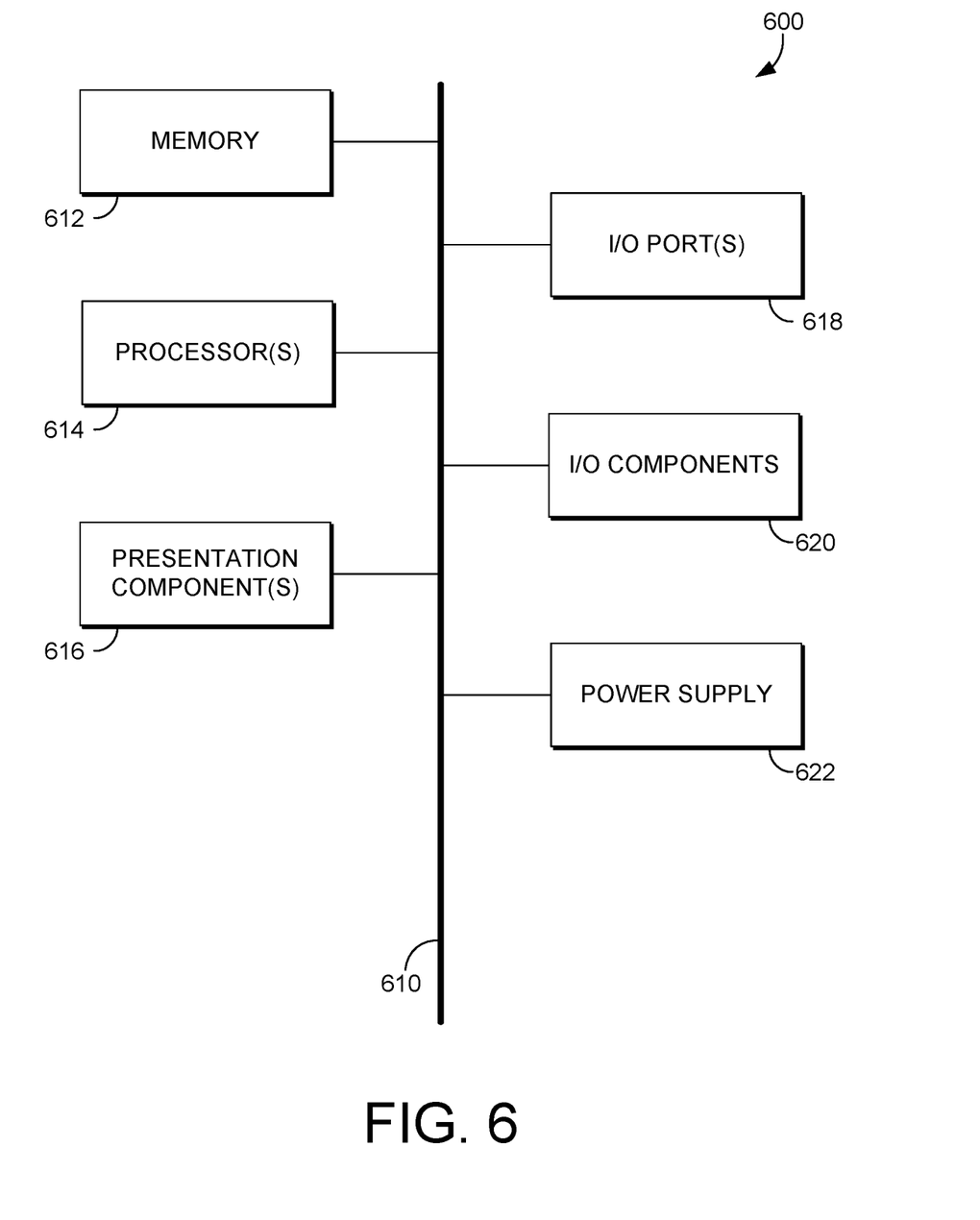
FIG. 6 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more buses (such as an address bus, data bus, or combination thereof). The various blocks of FIG. 6 are shown with lines for the sake of conceptual clarity, and other arrangements of the described components and/or component functionality are contemplated. For example, one may consider a presentation component such as a display device to be an I/O component. In addition, processors have memory. Such is the nature of the art, and reiterate that the diagram of FIG. 6 is merely illustrative of an example computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
receiving a natural-language sequence of words comprising multiple entities, wherein the entities comprise persons and places;
identifying a plurality of entities in the natural-language sequence;
generating a masked natural-language sequence by masking a first entity in the natural-language sequence;
generating a first representation of the masked natural-language sequence, wherein the first representation is a machine embedding of the masked natural-language sequence;
retrieving, from a knowledge base, information related to a second entity in the plurality of entities;
generating a second representation of the information; and
training a natural-language model to respond to a query, wherein the training uses the first representation of the masked natural-language sequence and the second representation of the information as inputs and the first entity as a training label.

2. The computer-implemented method of claim 1, wherein the information is a triple comprising the second entity, a third entity, and a relationship between the second entity and the third entity.

3. The computer-implemented method of claim 2, further comprising generating a natural language phrase that includes the second entity, the third entity and the relationship.

4. The computer-implemented method of claim 3, wherein the second representation of the information is a machine embedding of the natural language phrase.

5. The computer-implemented method of claim 2, further comprising generating a similarity score between the first representation of the natural-language sequence of words and the second representation of the information.

6. The computer-implemented method of claim 5, wherein the similarity score is based on a relational similarity score between a machine embedding of the relationship from the triple and a machine embedding of the natural-language sequence of words.

7. The computer-implemented method of claim 5, wherein the information is associated with the similarity score above a threshold rank when stack ranked with similarity scores calculated for other information retrieved from the knowledge base.

8. The computer-implemented method of claim 1, wherein the training comprises masked language modelling where a training objective is to predict the first entity.

9. A non-transitory computer-readable medium storing computer-executable instructions that, when executed by a processing device, cause the processing device to:
- receiving a query comprising a natural-language sequence of words;
- identifying a plurality of entities in the natural-language sequence of words, wherein the entities comprise persons and places;
- retrieving, from a knowledge base, information related to an entity in the plurality of entities, wherein the information is a triple comprising the entity, a second entity, and a relationship between the entity and the second entity;
- generating a natural language phrase that includes the entity, the second entity and the relationship;
- generating a first representation of the natural-language sequence comprising a machine embedding of the natural-language sequence;
- generating a second representation of the information comprising a machine embedding of the natural language phrase;
- providing the first representation of the natural-language sequence of words and the second representation of the information to a natural-language model;
- in response to the providing, generating, using the natural-language model, a natural language response to the query; and
- communicating the natural language response.

10. The non-transitory computer-readable medium of claim 9, wherein the natural language response is provided by a chat bot.

11. The non-transitory computer-readable medium of claim 9, wherein the response includes a natural language phrase.

12. The non-transitory computer-readable medium of claim 9, further comprising generating a similarity score between the first representation of the natural-language sequence of words and the second representation of the information.

13. The non-transitory computer-readable medium of claim 12, wherein the similarity score is based on a relational similarity score between a machine embedding of the relationship from the triple and the machine embedding of the natural-language sequence of words.

14. The non-transitory computer-readable medium of claim 12, wherein the information is associated with the similarity score above a threshold rank when stack ranked with similarity scores calculated for other information retrieved from the knowledge base.

15. A system comprising:
- a memory component; and
- a processing device coupled to the memory component, the processing device to perform operations comprising:
- receiving a natural-language sequence of words;
- identifying an entity in the natural-language sequence of words;
- retrieving, from a knowledge base, a plurality of triples related to the entity, wherein each triple in plurality of triples comprises the entity, a second entity, and a relationship between the entity and the second entity;
- for each triple in the plurality of triples, calculating a similarity score that represents an amount of similarity between the natural-language sequence of words and an individual triple;
- selecting a top plurality of triples from the plurality of triples using the similarity score;
- providing a first representation of the natural-language sequence of words and a second representation of the top plurality of triples to a natural-language model;
- in response to the providing, generating, using the natural-language model, a natural language response to the natural-language sequence of words; and
- communicating the natural language response to a user.

16. The system of claim 15, wherein each of the plurality of triples comprise the entity, a second entity, and a relationship between the entity and the second entity.

17. The system of claim 16, further comprising generating a natural language phrase that includes the entity, the second entity and the relationship.

18. The system of claim 17, wherein the first representation of the natural-language sequence is a machine embedding of the natural-language sequence and the second representation of the top plurality of triples includes a machine embedding of the natural language phrase.

19. The system of claim 18, wherein the similarity score is based on a relational similarity score between a machine embedding of the relationship from the individual triple and a machine embedding of the natural-language sequence of words.

20. The system of claim 18, wherein the natural language response is provided by a chat bot.

* * * * *